March 2, 1954 — T. G. PRENTICE — 2,670,558
FISHING LURE
Filed May 28, 1952
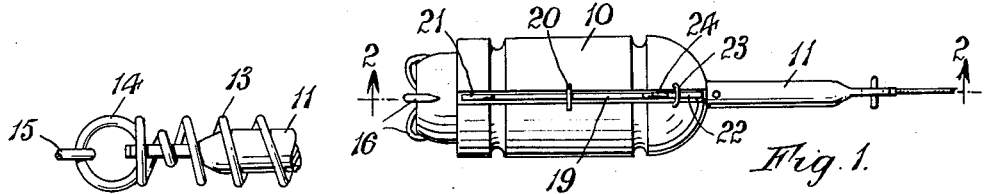
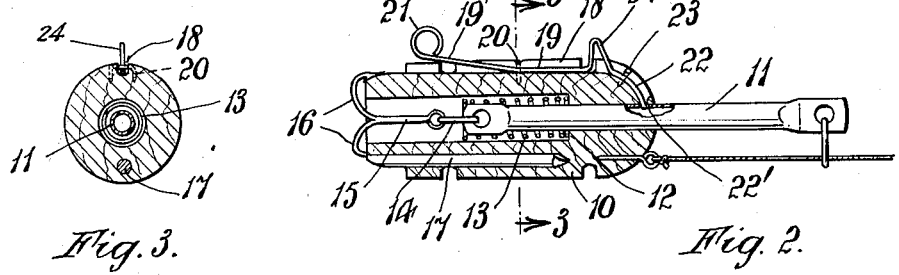
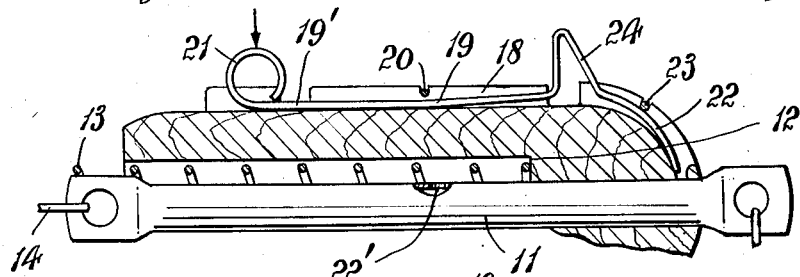
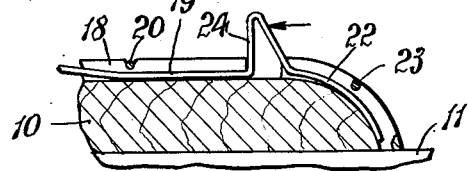
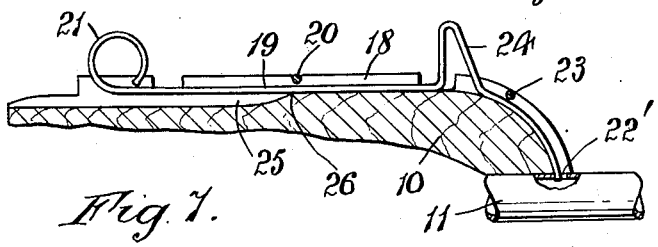
INVENTOR.
Thomas G. Prentice.
BY Stanley Lightfoot
Attorney.

Patented Mar. 2, 1954

2,670,558

UNITED STATES PATENT OFFICE 2,670,558

FISHING LURE

Thomas G. Prentice, Detroit, Mich.

Application May 28, 1952, Serial No. 290,452

3 Claims. (Cl. 43—35)

This invention relates to a fishing lure of the type such as is described in Patent No. 2,552,113, granted to me May 8, 1951, wherein spring and latch means are provided to project a barbed hook into engagement with the mouth of a fish upon seizure of the lure; and has for its object to provide for still greater sensitivity of this type of lure to responsive action upon being seized, either completely or partially, by a fish in any of the several manners in which a lure may be taken thereby.

A further object of the said invention is to provide such a lure which may be safely cast or drawn more or less violently through weeds or obstructions with a minimized danger of springing the latch mechanism and so prematurely ejecting the hook to a position wherein the barbs are freely exposed.

A still further object is to provide such a type of lure wherein the fishing line passes through a loop or guide on the axially slidable rod thereof, whereby the line assists in maintaining the body of the lure in substantial alignment therewith when the device is being cast or drawn through the water; and wherein the fishing line is attached directly to the body of the lure so that no strain on the line is imparted to the latch mechanism such as might result in premature operation thereof.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 1 is a top plan view of a fish lure embodying the said invention;

Figure 2 is a longitudinal sectional view of the same taken on a plane indicated by the line 2—2 in Figure 1;

Figure 3 is a transverse section of the same taken on a plane indicated by the line 3—3 in Figure 2;

Figure 4 is a fragmentary detail view in plan of the rear end of the sliding rod of the device showing a method of anchoring the actuating spring thereto;

Figure 5 is a partial longitudinal sectional view, similar to Figure 2, showing the position of the latching device when rocked to a position of release;

Figure 6 is a fragmentary longitudinal section of the upper portion of the lure illustrating the latching device moved to a releasing position as the result of a longitudinal slanting motion; and Figure 7 is a fragmentary longitudinal section of the lure showing a somewhat modified arrangement providing for the rocking of the latching device to a releasing position, the device being shown in its latching position.

Similar characters of reference indicate similar parts in the several figures of the drawing.

10 indicates the body member of the lure which is shown as being tubular to slidably accomodate the rod 11, said body being counterbored to provide an internal shoulder 12 and to accomodate a compression spring 13; one end of which spring bears against the said shoulder 12 and the other end against a link 14. The elongated shank 15 of a fish hook having a plurality of barbs 16 is attached to the said link 14.

It will be seen that the body 10 of the lure is urged forwardly of the rod 11 by the compression spring 13 and that the said body 11 may be manually drawn rearwardly on the said rod against the resistance of the said spring 13 until the suitably shaped rear end portion of the said body 10 nests within the pointed ends of the barbs 16, as clearly seen in Figures 1 and 2, and shields these points in such a manner that they are effectively prevented from snagging in weeds or obstructions in the water as long as the hook is maintained in this shielded position.

Special latching means about to be described are mounted on the said body for maintaining the body in this shielding position, until such time as the body is required to be withdrawn from its nested position in relation to the hook such as when the said body is seized by a fish.

It will be noted that the body 10 has a weight 17 incorporated in the under portion thereof and that the upper portion of the said body is recessed at 18 to receive a rockable latch member 19, which may be formed of wire as shown, secured in position intermediate of its length in the said recess 18 by a staple 20.

This latch member 19, in Figures 1, 2, 5, and 6, is shown as being bent intermediate of its length to provide a fulcrum point in proximity of the staple 20 so that the tail portion 19' is somewhat raised in the latching position, as clearly shown in Figure 2, the rear terminal portion of the said member being upwardly looped, as at 21, to provide an upwardly extending projection or abutment which may be depressed by a fish closing its mouth about the rear end portion of the said lure.

Such depression of the said abutment 21 in the manner described will result in the corresponding elevation of the arcuate forward end 22 of the latch member, as shown in Figure 5, it being understood that, in the normal or "closed" condition of the lure with the rod 11 extended forwardly on the body 10 and the hook protected in the manner described and shown in Figure 2, the end of the arcuate portion 22 of the latch member is engaged in a suitably positioned hole or recess 22' in the said rod 11 to maintain the assembly in this "closed" condition against the reaction of the spring 13.

The said arcuate portion 22 of the latch member 19 is loosely maintained in position over the rounded forward end of the body member 10 by the staple 23 whereby the said arcuate portion 22 of the forward end of the latch member may ride back over the rounded, or cammed, front end of the body member upon the latch member being moved rearwardly thereof as by the pull of a fish closing its mouth about a projection 24 extending upwardly of the said latch member. Thus, the rod 11 is released in the same manner as described in my earlier Patent No. 2,552,113, although a rearward pull on the loop 21 could also produce this same sliding action of the latch member over the body member.

It will be seen that provision having been made for the unlatching of the rod 11 by both a pulling action as well as a depressing action of the latch member, the latch is rendered sensitive to the grasping of the lure either completely or partially in a variety of ways characterizing the habits of different types of fish, or the circumstances under which the fish may take the lure, and this greatly enhances the assurance of the barbed hook being projected rearwardly into engagement with the fish under such differing circumstances.

In the modified example shown in Figure 7, the fulcruming of the latch member is secured in a slightly different manner than that described with the reference to Figures 1 to 6; the latch member in this case, instead of being bent as in the other figures, is straight and the body member 10 longitudinally recessed, as at 25, beneath the rear end portion of the said latch member to provide a fulcrum point 26 about which the said latch member may be vertically rocked by pressure on the abutment 21. The operation of this latch member as shown in Figure 7, of course, is the same as that already described in reference to the other figures in all essential respects.

This invention may be developed within the scope of the following claims without departing from the essential features of the said invention, and it is desired that the specification and drawing be read as being merely illustrative of a practical embodiment of the same and not in strictly limiting sense.

What I claim is:

1. A fishing lure comprising a tubular body, a line attached to the front end of said body, a rod slidable coaxially through said body, a barbed hook having an elongated shank linked to the rear end of said rod, a compression spring resisting forward movement of said rod in said body, latch means for securing said rod in a position of forward adjustment in said body wherein the rear end of said body nests protectively within the barbs of said hook, including a longitudinally slidable member on said body acting to unlatch said rod when said member is moved rearwardly relative to said body, said slidable member being also fulcrumed intermediate its length with that portion of said member rearwardly of said fulcrum being inclined outwardly away from said body whereby pressure on the rear end of said member in a direction radial of said body will also unlatch said rod.

2. A fishing lure comprising a tubular body, a line attached to the front end of said body, a rod slidable coaxially through said body, a line guide ring on the forward end of said rod, a barbed hook having an elongated shank linked to the rear end of said rod, a compression spring resisting forward movement of said rod in said body, latch means for securing said rod in a position of forward adjustment in said body wherein the rear end of said body nests protectively within the barbs of said hook, including a longitudinally slidable member on said body acting to unlatch said rod when said member is moved rearwardly relative to said body, said slidable member being also fulcrumed intermediate its length with that portion of said member rearwardly of said fulcrum being inclined outwardly away from said body whereby pressure on the rear end of said member in a direction radial of said body will also unlatch said rod.

3. A fishing lure comprising a tubular body, a line attached to the front end of said body, a rod slidable coaxially through said body, a barbed hook having an elongated shank linked to the rear end of said rod, a compression spring resisting forward movement of said rod in said body, latch means including a longitudinally slidable member on said body, having a portion thereof provided with a bend toward said rod for securing said rod in a position of forward adjustment in said body wherein the rear end of said body nests protectively within the barbs of said hook, and a portion of said body forming a cam element for transforming longitudinal movement of said member into radial movement of said latch means relative to said rod, said slidable member being also fulcrumed intermediate its length with that portion of said member rearwardly of said fulcrum being inclined outwardly away from said body whereby pressure on the rear end of said member in a direction radial of said body will also unlatch said rod.

THOMAS G. PRENTICE.

References Cited in the file of this patent
UNITED STATES PATENTS

| Number | Name | Date |
|---|---|---|
| 839,611 | Martin | Dec. 25, 1906 |
| 969,014 | Walters | Aug. 30, 1910 |
| 2,445,461 | St. John | July 20, 1948 |
| 2,552,113 | Prentice | May 8, 1951 |